United States Patent [19]

Lejeune

[11] 3,838,725
[45] Oct. 1, 1974

[54] MOTORCYCLE-SIZE SPARE TIRE FOR AUTOMOBILES

[75] Inventor: Daniel Lejeune, Clermont-Ferrand, France

[73] Assignee: Compagnie Generale des Etablissements Michelin raison sociale Michelin & Cie, Clermont-Ferrand (Puy-de-Dome), France

[22] Filed: Feb. 15, 1973

[21] Appl. No.: 332,725

[30] Foreign Application Priority Data
Mar. 1, 1972  France ............................. 72.7139

[52] U.S. Cl. ...... 152/209 R, 152/330 R, 152/361 R
[51] Int. Cl. ......................... B60c 11/06, B60c 9/18
[58] Field of Search ........ 152/209 R, 330 R, 361 R, 152/352, 187

[56] References Cited
UNITED STATES PATENTS

| | | | |
|---|---|---|---|
| 2,600,231 | 6/1952 | Ewart | 152/352 |
| 3,393,725 | 7/1968 | Sidles | 152/352 |
| 3,435,874 | 4/1969 | Mirtain et al. | 152/352 |
| 3,581,794 | 6/1971 | Heuze et al. | 152/361 |
| 3,623,527 | 11/1971 | O'Neil | 152/361 |
| 3,625,272 | 12/1971 | Fletcher | 152/361 |

*Primary Examiner*—Dryton E. Hoffman
*Attorney, Agent, or Firm*—Brumbaugh, Graves, Donohue & Raymond

[57] ABSTRACT

A spare tire for automobiles is of the same circumference but of substantially smaller width than the normal or reference tires for the vehicle and is inflated to a substantially higher pressure. The tread of the spare tire is reinforced over its entire width and is formed with grooves which, as compared to those of each reference tire, are of reduced depth or rate.

8 Claims, 5 Drawing Figures

PATENTED OCT 1 1974　　3,838,725
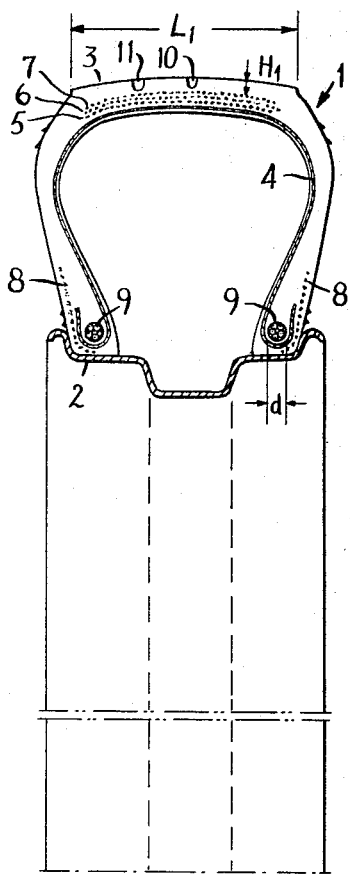
FIG. 1.1
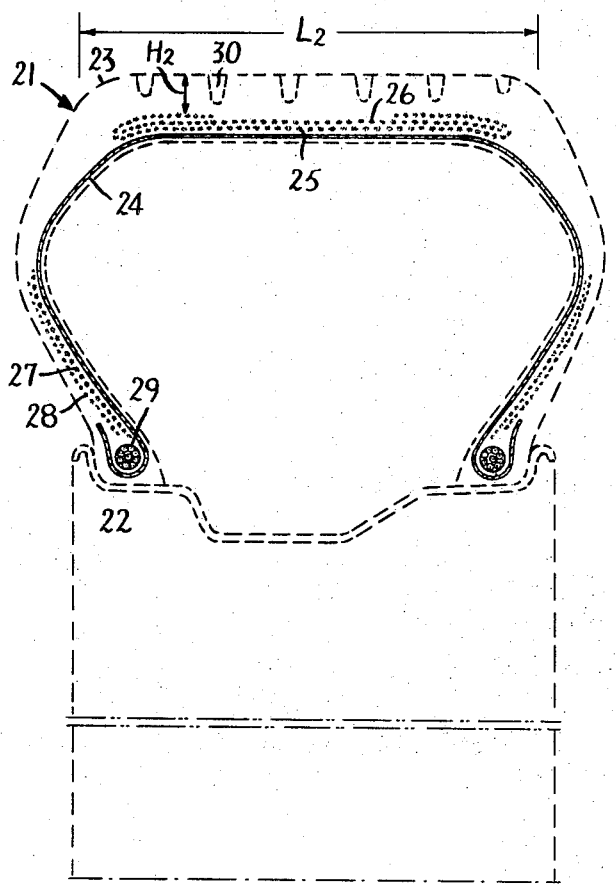
FIG. 2.1
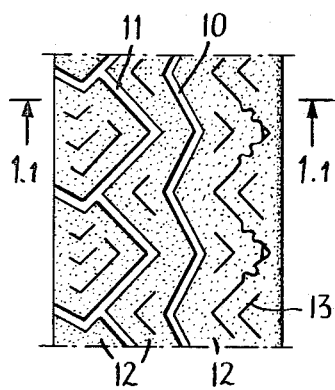
FIG. 1.2
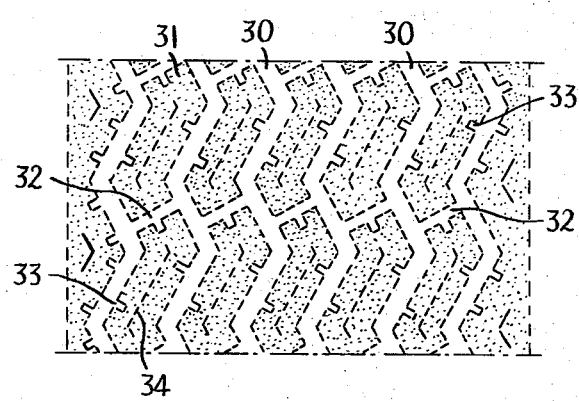
FIG. 2.2
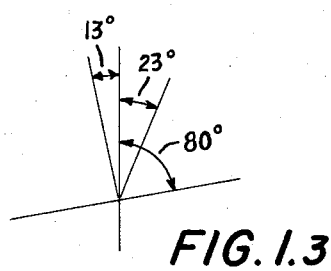
FIG. 1.3

MOTORCYCLE-SIZE SPARE TIRE FOR AUTOMOBILES

BACKGROUND OF THE INVENTION

This invention relates to tires and, more particularly, to novel and highly-effective tires intended for the spare wheels of automobiles.

In present practice, the spare wheel of a car is identical to the other four wheels equipping the vehicle. Since blowouts and tire damage are becoming less frequent, there is less and less justification for encumbering a car with a bulky spare tire and wheel. The problem is all the greater when the fifth wheel takes up a lot of space and when less space is available to house it, as is true, in particular, of high-speed, powerful cars.

In order to overcome this problem, it has already been proposed to construct spare wheels which are different from the normal wheels and in particular less bulky and lighter. Thus it has been suggested to equip the spare wheels with tires having the same rolling circumference as normal tires but of a substantially smaller tube size and subject to a substantially greater inflation pressure. For example, it has been proposed to use as safety wheel one whose rim and tire have the dimensions of a motorcycle rim and tire but withstand an inflation pressure in excess of ten atmospheres.

This proposal, which seems attractive at first, has proved unsatisfactory thus far. By inflating a tire having a very narrow tread to a very high pressure, one can, in fact, cause it to bear the same load as a tire with tread of normal width inflated to a normal pressure, but this result is obtained only at the cost of very serious drawbacks.

A first drawback is the use of an excessive inflation pressure. In order to enable a tire with a narrow tread to bear the same load as a tire with a tread of normal width, it is not sufficient to increase the inflation pressure in a proportion corresponding to the ratio of reduction in width of the tread. The increase in pressure produces a reduction of the area of the tire in contact with the ground, particularly in the case of bias-carcass tires. This reduction must be compensated for by an additional increase in pressure. This explains why, for a spare tire whose tread has a width which is reduced by one-half, a pressure of the order of ten atmospheres, that is to say, at least four times the normal pressure of a normal car tire, has been considered necessary. As can easily be realized, a tire inflated to ten atmospheres is almost as uncomfortable as a solid tire. It may be recalled in this connection that a truck tire is inflated to a pressure which rarely exceeds eight atmospheres with suspension members adapted to such a high pressure.

A second drawback, which is related to the first, is that a substantial increase in the inflation pressure effected without adaptation of the structure of the tire results in a substantial reduction in the resistance to swerving, that is to say, in the cornering properties of the tire. As those skilled in the art know, when traveling with an imposed toe-in of, for instance, 2°, the thrust developed by the tire, which tends to cancel out the drift and to make the tire resume a path parallel to the plane of symmetry, depends on the inflation pressure. This thrust passes through a maximum for a given value of the inflation pressure, which value in general is slightly greater—for instance by 0.5 bar—than the pressure recommended by the manufacturer for rated load. If the inflation pressure is doubled or tripled, the drift thrust and tracking in turns are considerably impaired. A car one of whose wheels has been replaced by a spare wheel equipped with an over-inflated tire with very narrow tread is not only uncomfortable but also dangerous since unbalanced.

The above explanations show why in practice the extremely simple solution of a spare wheel equipped with an over-inflated tire with very narrow tread has not been adopted. Such a spare wheel is only a means of reaching, at very reduced speed, the nearest repair station, and not a satisfactory substitute for a normal wheel.

SUMMARY OF THE INVENTION

An object of the invention is to provide a spare tire-wheel assembly which takes up less space than a normal wheel and which can replace the normal wheel without substantial effect on the behavior of the car, even at high speed, it being understood that the spare tire is not required to supply the same mileage before it is worn out as a normal wheel is.

The foregoing and other objects are attained in accordance with the invention by the provision of an automobile spare-wheel tire that in new condition has a tread of a circumference close to that of the reference tire in new condition (that is to say, the tire to be replaced in case of a flat) but a substantially smaller width and is intended to be inflated to a substantially higher pressure. The tire is characterized in that the tread on the one hand is reinforced over its entire width by a tread reinforcement and on the other hand has an increased resistance to shearing as a result in particular of a smaller groove depth and/or groove rate than the reference tire.

By groove rate is meant the cutting ratio of the areas of the recessed parts to the areas of the parts in relief.

The tire is preferably characterized by a number of additional features:

a. The tread reinforcement has a rigidity per unit of surface at least equal to that of the tread reinforcement of the reference tire; the tread reinforcement of the spare tire comprises, for instance, three superimposed plies of steel cords oriented in three different directions, particularly when the reference tire has a tread reinforcement formed of a smaller number of plies of steel cables.

b. The reinforcement of the sidewalls of the spare tire is formed of cords arranged in radial planes and formed of relatively elastic material; a radial carcass of polyamide cords of relatively low modulus of elasticity and relatively high breaking load is particularly suitable.

c. The ratio of the reduction in thickness of the tread and/or the depth of the grooves with respect to the reference tire when both are in new condition is at most equal to the ratio of reduction of width of the tread.

d. The total thickness of the tread is reduced as compared with the reference tire.

e. The tread is of the asymmetrical type; the edge intended to be placed on the outside is less cut out than the inside edge.

f. The ratio of reduction of the width and the thickness of the tread with respect to the reference tire is about ½, and the inflation pressure is about 2.5 times that of the reference tire and in any case does not exceed 3 times that of the reference tire.

The various measures described have the effect on the one hand of avoiding excessive inflation of the spare tire and on the other hand of imparting to it a drift thrust, with small angles, and under normal load, which is not too different from that of the reference tire under the same conditions.

The provision of a spare tire having a narrow tread belted over its entire width by a tread reinforcement has a number of advantages:

In the absence of a tread reinforcement, the required increase in the inflation pressure produces a large simultaneous reduction of the length and width of the contact surface. When the pressure becomes very high, the tire rests on the ground over a comparatively small fraction of the width of the tread. The provision of a tread reinforcement ensures on the other hand that practically the entire width of the tread is in contact with the ground. The tread reinforcement thus makes it possible to reduce the inflation pressure necessary to carry the same load. There is a resulting gain in both comfort and in safety.

The increase in the resistance to shear of the tread, which constitutes an important feature of the invention, is justified by the following considerations:

As indicated above, the resistance to drift of a tire increases with the inflation pressure up to a maximum, whereupon it decreases. As the reference tire is normally inflated to a pressure slightly less than but close to that which produces the maximum resistance to drift, the tire of the spare wheel of the same type of construction is normally inflated to a far higher pressure. Because of the high pressure, its resistance to drift is not maximum, this being all the more evident the smaller its cross-section.

It is therefore advisable to provide it with a structure which increases the resistance to drift.

It has been attempted first of all to obtain a greater resistance to drift by making the tread more rigid. However, the gain in rigidity thus obtained is not substantial, contrary to all expectations.

On the other hand, a substantial gain in rigidity is obtained by varying the characteristics of the tread, as surprising as this appears. The depth of the grooves and the groove rate have thus been found to be the most important factors for increasing the resistance to drift of a tire of uncustomary type with narrow tread, inflated to a relatively high pressure.

The invention thus provides a spare wheel which is less bulky and which, without excessive increase in pressure, has road qualities, particularly comfort and road-holding, which are comparable to those of normal wheels.

BRIEF DESCRIPTION OF THE DRAWING

A better understanding of the invention can be gained from a consideration of the following detailed description of the preferred embodiment thereof, in conjunction with the appended figures of the drawing, wherein:

FIG. 1.1 shows in radial section, mounted on its wheel, a spare tire in accordance with the invention;

FIG. 1.2 shows in plan view a sector of the tread of the same tire;

FIGS. 2.1 and 2.2 show, on the same scale, a radial section and a plan of a tread of a normal tire serving as a reference, and as such shown in dot-dash lines; and FIG. 1.3 shows schematically the orientation of the cords of the tread reinforcement of the tire of the invention.

DESCRIPTION OF THE PREFERRED EMBODIMENT

FIGS. 1.1 and 1.2 show a tire 1 in accordance with the invention in size 105 × 19. It is mounted on a wheel 2 of size 3¼ × 19 to form a spare tire-wheel assembly intended provisionally to replace the assembly formed by the tire 21 and its rim 22 shown in FIGS. 2.1 and 2.2., the respective sizes of which are 205/70 CR 15 and 6 × 15.

As the drawings, which are made on the same scale show, the tires 1 and 21 have treads 3 and 23 with the same radius but respective widths $L_1$ and $L_2$ of 8 and 16 cm, that is to say, in the ratio of 1 to 2. These two tires are designed to hold a rated load of 580 kg, the tire 1 at an inflation pressure of 5 bars, and the tire 21 at an inflation pressure of 2.3 bars.

The drawings permit an easy comparison of the details of construction of the two tires.

With respect to the carcass, the tires 1 and 21 are both reinforced with a single carcass ply, the ply 4 for the former and the ply 24 for the latter, of textile cords arranged in radial planes. The ply 4 is of polyamide cords of 1880 × 4 decitex, and the ply 24 of polyamide cords of 1880 × 3 decitex.

With regard to the tread reinforcement, the tire 1 is reinforced with three top plies 5, 6, 7 of identical steel cables, each formed of four wires of 0.23 mm diameter, hooped by one wire of 0.12 mm. The plies 6 and 7 have their cords inclined in opposite directions with angles of 13° and 23° to the circumferential direction. The ply 5 is formed of cords inclined by an angle of 80°, therefore triangulating those of the plies 6 and 7 (see FIG. 1.3). The ply 7 envelops the ends of the plies 5 and 6 and is extended slightly in the direction of the sidewalls. The assembly comprising the three plies 5, 6, 7 thus covers the entire width of the tread 3.

By way of comparison, the tread reinforcement of the tire 21 is less rigid in view of the difference in width. It comprises two plies 25 and 26 of steel cords. The ply 25 has its edges folded around those of the ply 26. The steel cords are composed of 4 strands of 7 wires of 0.12 mm in diameter.

With respect to the reinforcement of the beads and of the low region of the sidewalls, the tire 1 is reinforced with a stiffener 8 on each side and by a bead wire 9. This stiffener is less rigid and proportionally less high than the two stiffeners 27 and 28 of the tire 21. Similarly, the bead wire 9 has a diameter $d$ which is less than that of the bead wire 29 of the tire 21.

The tire 1 is provided with a tread 3 whose height $H_1$ is about 4.5 mm as compared with $H_2 = 12$ mm approximately in the case of the tread 23 of the tire 21. The tread 3 is furthermore carved or molded so that two circumferential grooves 10 and 11 are provided whose depth is 4 mm and whose width at the tread surface is 3 mm. On the other hand, the tread 23 of the tire 21 has six circumferential grooves 30 the maximum depth of which is 10 mm and the width at the tread surface of which is 6 mm.

As FIG. 1.2 shows, the tread 3 is carved or molded asymmetrically: the groove 10 is in the vicinity of the median plane and forms a zigzag of small amplitude; the groove 11 is in the half of the tread intended to be on the inner side and forms a zigzag of large amplitude. The three circumferential ribs 12 defined by the grooves 10 and 11 are relatively wide. They are cut with incisions such as 13 which improve adherence to the road.

By way of comparison, the tread 23 of the reference tire 21, as shown in FIG. 2.2, is carved or molded symmetrically by numerous circumferential grooves 30 defining circumferential ribs 31 which are not as wide as the circumferential ribs 12 of the tire 1. Furthermore, the circumferential ribs 31 are made flexible by transverse grooves 32 and cuts 33 in addition to the incisions 34.

The following table gives a comparison of the drift thrusts provided by the tire 1 in accordance with the invention and the reference tire 21 at a load of 500 kg with a drift of 2°.

| Pressure | Thrust in daN | |
|---|---|---|
| Bars | Tire 1 | Tire 21 |
| 1 | 100 | 150 |
| 2 | 160 | 230 |
| 3 | 200 | 260 |
| 4 | 230 | 230 |
| 5 | 240 | 200 |
| 6 | 250 | 160 |

As can be seen, the drift thrust of the tire in accordance with the invention is, for a pressure of 4 to 6 bars, similar to that of the reference tire for a pressure of 2 to 2.5 bars.

A car was equipped with three tires of the type of the tire 21 and one tire of the type of tire 1, the latter being placed either in front or in the rear. Prolonged travel at 150 km/hr. showed that a spare wheel in accordance with the invention did not substantially modify the behavior of the vehicle. The spare tire thus permits the driver who is the occasional victim of a blowout to complete the trip undertaken at practical normal speed. It furthermore provides him permanently with an appreciable saving in space.

The embodiment described above is merely exemplary, and those skilled in the art will be able, upon consideration of this disclosure, to make many modifications therein within the spirit and scope of the invention. The invention is therefore not limited except by the following claims.

I claim:

1. A spare tire for a vehicle normally equipped with a plurality of reference tires of reference circumference and reference width and inflated to a reference pressure, each of the reference tires comprising a tread formed with grooves of a reference depth and cutting ratio, said spare tire having a circumference substantially equal to said reference circumference but a width substantially smaller than said reference width and intended to be inflated to a pressure substantially higher than said reference pressure and comprising a spare-tire tread and a spare-tire tread reinforcement reinforcing said spare-tire tread over its entire width, said spare-tire tread being formed with grooves of which the depth or cutting ratio is less than said reference depth or cutting ratio, respectively.

2. A spare tire according to claim 1 wherein the rigidity of said spare-tire tread per unit of surface is at least as great as that of the tread of each reference tire.

3. A spare tire according to claim 1 wherein said spare-tire tread reinforcement comprises three superimposed plies of steel cords, the cords of the three plies respectively extending in three different directions.

4. A spare tire according to claim 1 wherein said spare tire further comprises a carcass reinforcement of cords extending radially and formed of polyamide.

5. A spare tire according to claim 1 wherein the thickness of the tread and the depth of the grooves of said spare tire in new condition are reduced, as compared to the thickness of the tread and the depth of the grooves of each reference tire in new condition, in a ratio that does not exceed the ratio of the reduction of the width of the spare tire as compared to the width of each reference tire.

6. A spare tire according to claim 1 wherein the depth of the tread of the spare tire is substantially less than the depth of the tread of each reference tire.

7. A spare tire according to claim 1 wherein the grooves of the tread of said spare tire are asymmetrical.

8. A spare tire according to claim 1 wherein the drift thrust of the spare tire substantially equals that of each reference tire for a ratio of inflation pressures, spare tire to reference tire, between 1.0 and 1.5 times the ratio of widths, reference tire to spare tire.

* * * * *